United States Patent

Link

Patent Number: 5,730,012
Date of Patent: Mar. 24, 1998

[54] BICYCLE SPROCKET LOCK

[76] Inventor: Donald M. Link, 4881 Lake Cecile Dr., Kissimmee, Fla. 34746

[21] Appl. No.: 784,692

[22] Filed: Jan. 15, 1997

[51] Int. Cl.$^6$ ................................................. B62H 5/08
[52] U.S. Cl. ........................ 70/236; 70/14; 28/259; 28/288.4
[58] Field of Search ........................... 70/233, 236, 227, 70/226, 14, 58, 57; 280/259, 288.4

[56] References Cited

U.S. PATENT DOCUMENTS

| 554,222 | 2/1896 | Hillhouse | 70/236 |
|---|---|---|---|
| 2,576,773 | 1/1951 | Buxton | 70/233 |
| 3,009,348 | 11/1961 | Colbert et al. | 70/227 |
| 3,550,409 | 12/1970 | Dariser | 70/203 |
| 3,789,634 | 2/1974 | Brown | 70/233 |
| 4,294,090 | 10/1981 | Metzger | 70/236 |
| 4,409,804 | 10/1983 | Sork | 70/236 |
| 4,658,609 | 4/1987 | Mickelson | 70/212 |
| 5,119,649 | 6/1992 | Spence | 70/14 |

FOREIGN PATENT DOCUMENTS

| 23918 | 1/1922 | France | 70/236 |
|---|---|---|---|
| 554806 | 6/1923 | France | 70/236 |
| 814786 | 8/1937 | France | 70/227 |
| 949648 | 6/1952 | France | 70/227 |
| 451949 | 10/1949 | Italy | 70/14 |
| 429834 | 5/1935 | United Kingdom | 70/227 |

Primary Examiner—Darnell M. Boucher

[57] ABSTRACT

A Bicycle Sprocket Lock (1) with indents (2) fits holes (3) to impede or free the sprocket (5) and is secured by a shackle (4) through holes (3) intersecting said lock.

1 Claim, 1 Drawing Sheet

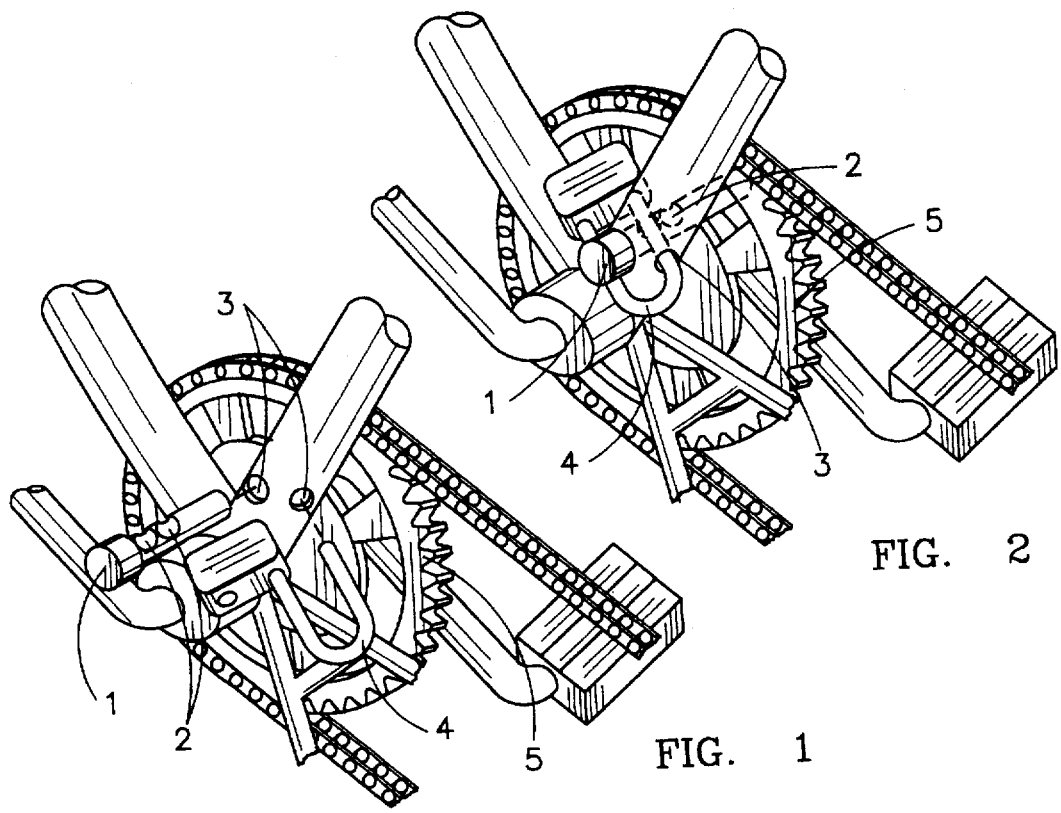
FIG. 2
FIG. 1
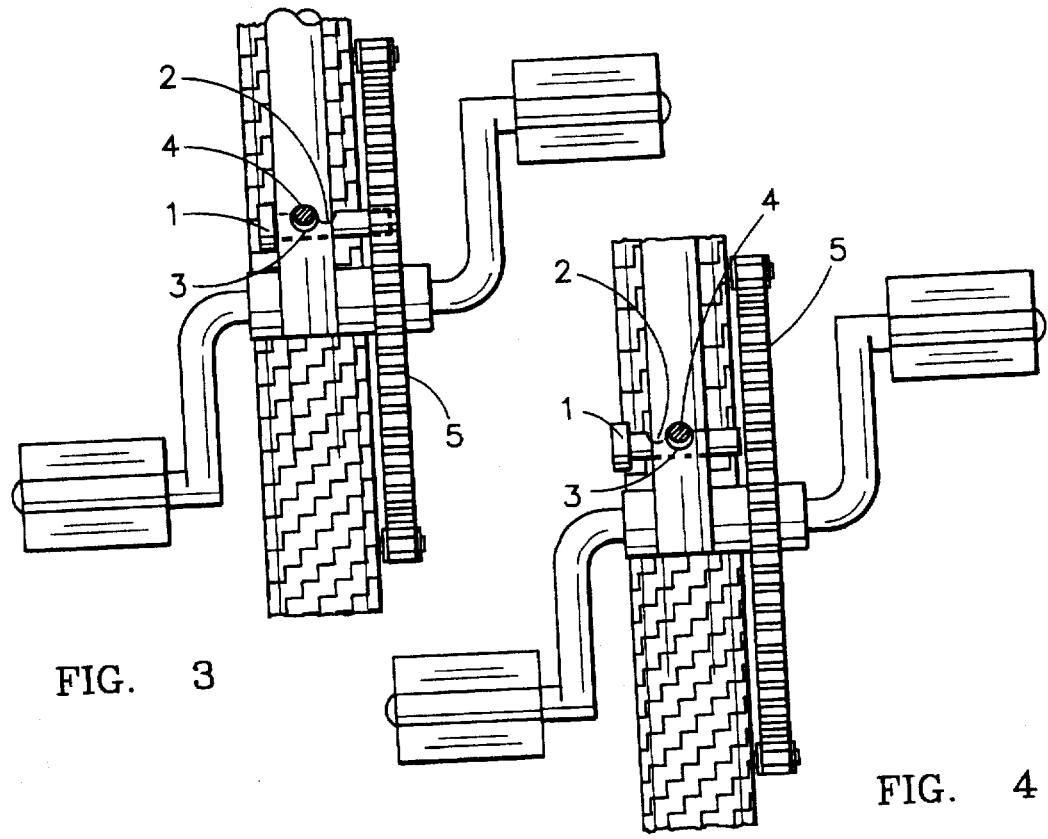
FIG. 3
FIG. 4

BICYCLE SPROCKET LOCK

BACKGROUND

1. Field of Invention

This invention relates to bicycles, specifically to lock the sprocket.

2. Objects and Advantages

The object of a Bicycle Sprocket Lock, is to prevent unauthorized use of the bicycle. Many times a pole or other object is not available to secure the bicycle, using a chain or cable. An advantage of the Bicycle Sprocket Lock, is that said lock becomes a part of the bicycle, therefore always available. Easily locked bicycles could make parking racks popular. Best of all, the Bicycle Sprocket Lock will stop many a theft.

DESCRIPTION OF DRAWINGS

FIG. 1 is a perspective of side view of my invention.

FIGS. 2 and 3 shows the Bicycle Sprocket Lock in the impede mode.

FIG. 4 shows the Bicycle Sprocket Lock in the free mode.

OPERATION OF INVENTION

A Bicycle Sprocket Lock (1) fits through holes (3) in the frame tube of the bicycle, and is secured in it's respective mode, impede (FIG. 2@3) or free (FIG. 4) by a shackle (4) intersecting the said lock (1) through holes (3) in the frame tube. The impede mode (FIG. 2@3) prevents the sprocket (5) from rotating.

The bicycle sprocket lock comprises a rod member 1 adapted for sliding engagement through a first one of the holes 3 formed in the frame tube of a bicycle adjacent to and oriented in a direction generally normal to a plane of the sprocket 5. The rod member 1 is of sufficient length to extend into the sprocket 5 when fully inserted into the first one of the holes 3. A second one of the holes 3 is oriented generally perpendicular to the first one of the holes and is offset by about one-half a diameter of the first hole. The rod member i has a pair of axially spaced, arcuately shaped slots 2 extending transversely across the rod. The slots 2 are sized to receive one arm of a shackle 4 of a shackle and cylinder lock. The slots 2 are arranged such that when one of the slots is aligned with the second one of the holes 3 and the shackle 4 inserted, the rod 1 is held in engagement with sprocket 5 thereby preventing rotation of the sprocket. When the other of the slots 2 is aligned with the second one of the holes 3, the rod 1 is held in a retracted position which does not interfere with rotation of the sprocket 5.

I claim:

1. A bicycle sprocket lock assembly in combination with a bicycle frame member and a sprocket, said assembly comprising a rod member adapted for sliding engagement through a first hole formed in said bicycle frame member adjacent to and in a direction normal to a plane of said sprocket of the bicycle, the rod member being of a sufficient length to be retained in the first hole and simultaneously passed at least partially through an opening in the sprocket, a second hole being formed in the frame member and oriented perpendicular to and offset from the first hole, said offset being one-half a diameter of the first hole, said rod having a pair of axially spaced, arcuately shaped slots formed transversely thereacross with a radius corresponding to a radius of the second hole, and an U-shaped shackle and cylinder lock adapted for attachment to the bicycle frame by passing one arm of the U-shaped shackle through the second hole, whereby the rod is attached to the bicycle frame and is adapted to be maintained in either an extended locked or withdrawn unlocked position with respect to the sprocket by alignment of a respective one of the shaped slots of the rod with the second hole prior to passing the one arm of the shackle through the second hole and fastening the shackle to the cylinder.

* * * * *